(12) United States Patent
Homola

(10) Patent No.: US 6,168,396 B1
(45) Date of Patent: Jan. 2, 2001

(54) FAN ASSEMBLY FOR FORCING FILTERED AIR INTO A MICRO COMPUTER CASE

(76) Inventor: Matthew Homola, 15609 NE. 90th St., Vancouver, WA (US) 98682

(*) Notice: Under 35 U.S.C. 154(b), the term of this patent shall be extended for 0 days.

(21) Appl. No.: 09/474,833

(22) Filed: Dec. 30, 1999

(51) Int. Cl.$^7$ .................................................. F04B 17/03
(52) U.S. Cl. ..................... 417/423.14; 417/360; 417/53
(58) Field of Search ..................... 417/423.14, 423.5, 417/423.15, 360, 423.7, 53; 361/695

(56) References Cited

U.S. PATENT DOCUMENTS

| | | | |
|---|---|---|---|
| 3,890,049 | * | 6/1975 | Collins et al. ........................ 356/429 |
| 4,767,262 | * | 8/1988 | Simon ................................... 415/119 |
| 4,774,631 | * | 9/1988 | Okuyama et al. .................... 361/695 |
| 4,911,231 | * | 3/1990 | Horne et al. ..................... 165/104.34 |
| 5,287,009 | * | 2/1994 | Heung ................................... 307/141 |
| 5,528,454 | * | 6/1996 | Niklos ................................... 361/695 |
| 5,673,029 | * | 9/1997 | Behl et al. ............................ 340/635 |
| 5,788,467 | * | 8/1998 | Zenitani et al. ...................... 417/360 |
| 6,031,717 | * | 2/2000 | Baddour et al. ...................... 361/687 |
| 6,042,474 | * | 3/2000 | Harvey et al. ........................ 454/184 |

* cited by examiner

Primary Examiner—Timothy S. Thorpe
Assistant Examiner—Robert Z. Evora
(74) Attorney, Agent, or Firm—Timothy E. Siegel

(57) ABSTRACT

A fan assembly adapted to be installed into a standard expansion slot of a microcomputer. The assembly comprises a frame, sized to fit into the standard expansion slot, including attachment members adapted to permit attachment of the frame into a standard expansion slot and defining an air passageway through the frame, the air passageway having a first opening coincident to the attachment members and having a second opening positioned away from the attachment members. Additionally, an electric fan is mounted in the frame and positioned to move air through the air passageway from the first opening through the second opening. Finally, an electrical conductor and connector assembly is adapted to be connected to a source of electrical power and to transmit electrical power from the source of electrical power to the electric fan.

19 Claims, 2 Drawing Sheets

FAN ASSEMBLY FOR FORCING FILTERED AIR INTO A MICRO COMPUTER CASE

FIELD OF THE INVENTION

The present invention is a fan assembly adapted to be installed in a standard expansion slot of a microcomputer.

BACKGROUND OF THE INVENTION

The most typical cause of failure of a microcomputer is dust that has settled on a component of the system and has caused an unwanted electrical connection. Unfortunately, currently available microcomputers have little in the way of safeguards against contamination by dust. Most microcomputers are equipped with two fans. A first fan is entirely internal to the computer case and cools the central processing unit (CPU) but does not draw air into or out of the computer. A second fan cools the transformer that provides voltage in the range of 5 to 12 VDC to the computer digital circuitry. The second fan typically draws air over the transformer surfaces and discharges the air through holes in the computer case. The discharged air is replaced by air that enters the computer by other holes in the case that are included for that purpose or by small seams where various case elements fit together. The replacement air is unfiltered and typically contains dust that may cause a computer failure.

SUMMARY

In a first aspect, the present invention is a fan assembly adapted to be installed into a standard expansion slot of a microcomputer. This assembly comprises a frame, sized to fit into the standard expansion slot, including attachment members adapted to permit attachment of the frame into the standard expansion slot and defining an air passageway through the frame, the air passageway having a first opening coincident to the attachment members and having a second opening positioned away from the attachment members. Additionally, an electric fan is mounted in the frame and positioned to move air through the air passageway from the first opening through the second opening. Finally, an electrical conductor and connector assembly is adapted to be connected to a source of electrical power and to transmit electrical power from the source of electrical power to the electric fan.

In a separate, second aspect, the present invention is a microcomputer adapted to avoid dust related failures and comprising a case defining a set of standard expansion slots and a fan assembly. This assembly includes a frame, an electric fan and an electrical conductor and connector assembly. The frame is sized to fit into the standard expansion slot, including attachment members adapted to permit attachment of the frame into the standard expansion slot and defining an air passageway through the frame, the air passageway having a first opening coincident to the case and having a second opening inside the case. The electric fan is mounted in the frame and positioned to move air through the air passageway from the first opening through the second opening. Finally, the electrical conductor and connector assembly is adapted to be connected to a source of electric power and to transmit electrical power from the standard internal power port to the electric fan.

In a separate, third aspect, the present invention is a method of retrofitting a microcomputer having a case and an unused standard expansion slot to be less susceptible to failure due to dust contamination, comprising the steps of: Providing a fan and filter assembly, including a frame, an electric fan, an electrical conductor and connector assembly. The frame is sized to fit into the standard expansion slot, including attachment members adapted to permit attachment of the frame into the standard expansion slot and defining an air passageway through the frame, the air passageway having a first opening coincident to the attachment members and having a second opening positioned away from the attachment members. The electric fan is mounted in the frame and positioned to move air through the air passageway from the first opening through the second opening. The electrical conductor and connector assembly adapted to be connected to a source of electrical power and to transmit electrical power from the source of electrical power to the electric fan. The filter is positioned in the air passageway and adapted to filter particles from air that is being moved from the first opening through the second opening by the fan. The fan and filter assembly is installed into the expansion slot of the microcomputer so that the fan brings air from outside the case through the first opening and the filter and out through the second opening into the interior of the case.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figure 1:
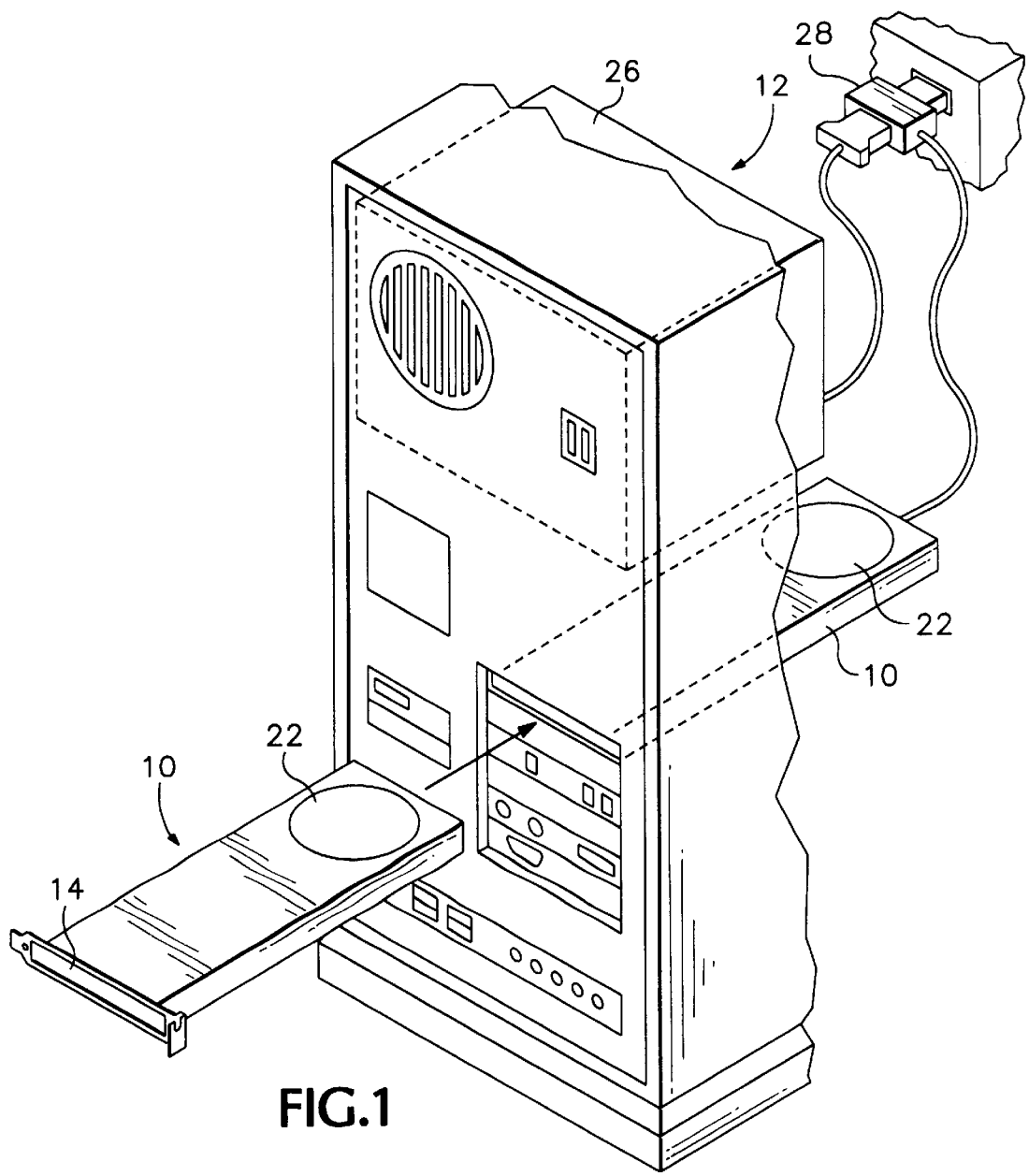
FIG. 1 is a perspective view of the inside of a microcomputer and of a fan and filter assembly according to the present invention, shown both above the microcomputer and as an item installed into the microcomputer.

Viewing FIG. 1, a preferred embodiment of the present invention is a fan and filter assembly 10 adapted to be connected into a standard expansion slot of a PC type personal computer or microcomputer 12. Air is drawn through a front opening 14, by a fan 16 drawn through a passageway 18 defined by the case 20 of assembly 10 and discharged into the interior of the computer 12 by way of a grated opening 22. The case 20 is also adapted to receive a replaceable dust filter 24. Assembly 10 is easily connected to the power supply 26 of the computer by way of a standard Molex connecter 28. As each component that is connected to power supply 26 is typically connected by way of a three-terminal "Y" connector, there should be a spare terminal available to connect to the fan assembly 10, regardless of the internal configuration of the computer 12. Assembly 10 is powered by 12 VDC power drawn through the connector 28.

The basic advantages of the present invention should now be evident. Assembly 10 creates a positive air pressure within computer 12, as opposed to the exterior of computer 12. Accordingly, assembly 10 introduces filtered air and the constant introduction of unfiltered air caused by the transformer-cooling fan is stopped. As a result, the entrance of dust particles into the computer case 20 is greatly reduced, if not stopped altogether. Accordingly, a substantially dust free environment is created within computer 12, leading to a greatly reduced number of dust related computer failures.

Figure 2:
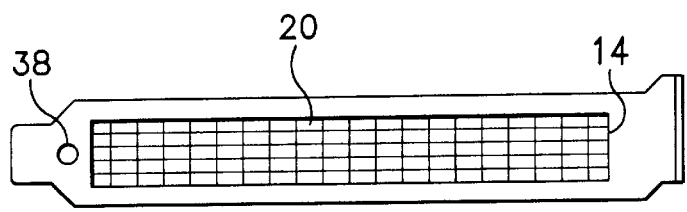
FIG. 2 is a front view of the fan and filter assembly of FIG. 1.
Figure 3:
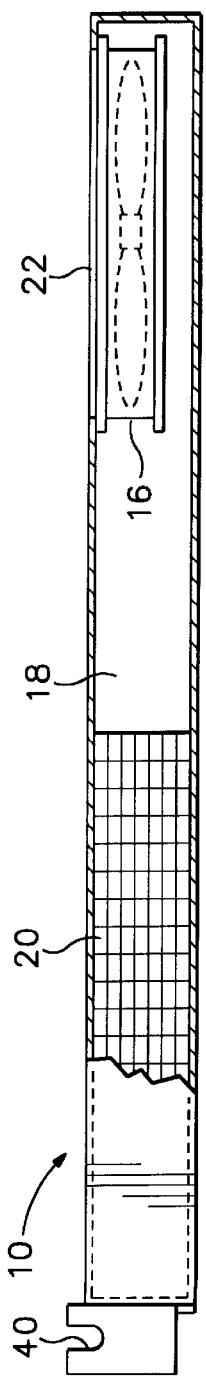
FIG. 3 is a side view of the fan and filter assembly of FIG. 1.
Figure 4:
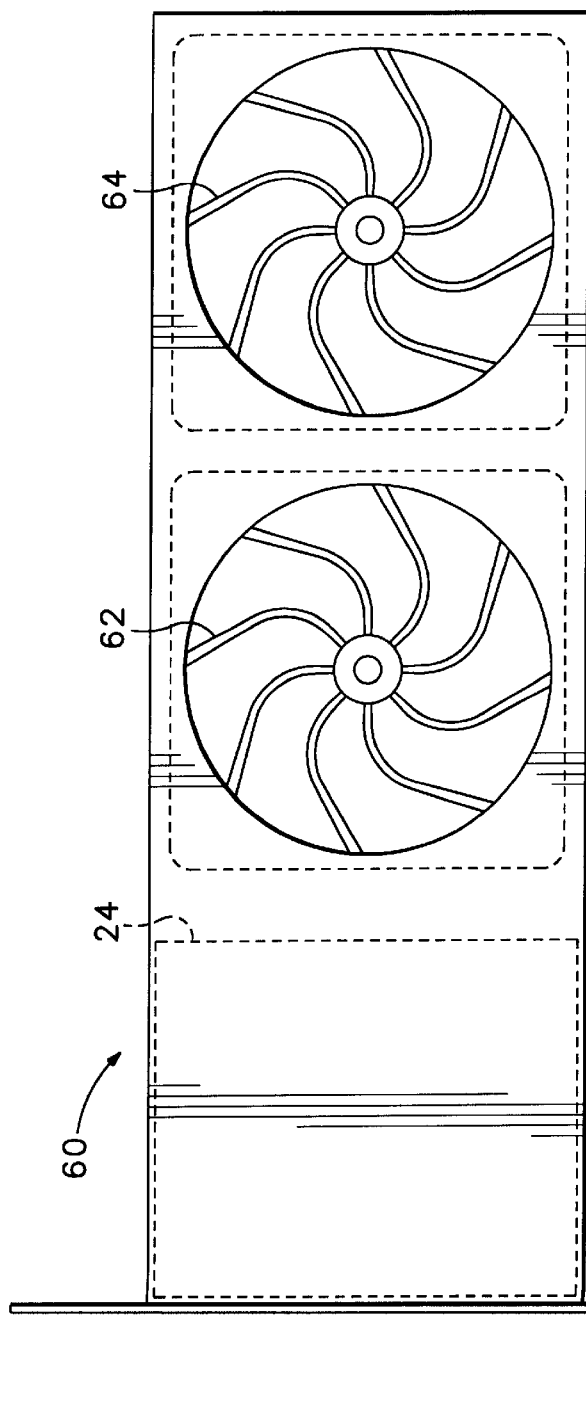
FIG. 4 is a top view of an alternative embodiment of a fan and filter assembly, having two fans.
Figure 5:
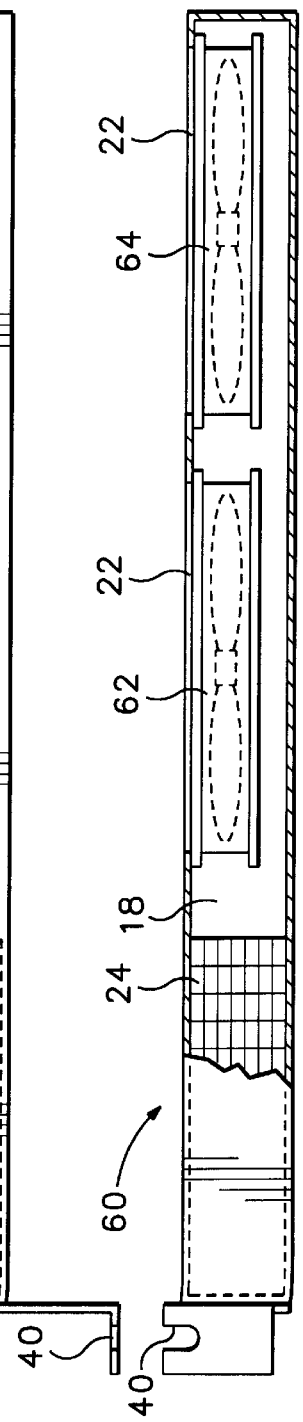
FIG. 5 is a side view of the fan and filter assembly of FIG. 4.

Referring specifically to FIG. 2, the front face of assembly 10 is adapted to be installed into a standard expansion slot of a microcomputer, and therefore is in the form of a standard bracket adapted for this purpose. The face is 12.09 cm (4.76 in) wide and is 1.86 cm (0.73 in) tall but narrows on the left hand side (facing assembly 10 [as in FIG. 2]) to 1.105 cm (0.435 in). A hole 38 is defined on the left hand side, for receiving a fastener. On the right hand side, a flange extends outwardly from the paper in FIG. 2 and defines a nick 40 (FIGS. 4 and 5) for receiving and being retained onto the computer frame by a fastener, such as a screw. FIGS. 4 and 5 show an embodiment 60 having two fans 62 and 64 for moving a larger volume of filtered air into computer 12. Each fan unit is a square of 8 cm (3.15 in) per side and is 1.4 cm (0.55 in) high. Fan 16 or 60 or 62 is preferably a 12 VDC NIDEC brand Mini Fan having dimensions of $3\frac{1}{8} \times 3\frac{1}{8} \times \frac{1}{4}$ available as listed in Catalog 272, 1999 Edition from Surplus Center of Lincoln, Nebra. The filter is made of Techx filtration media for dust and smoke filtration, has an efficiency rating of: Minimum NaCl=80%; Minimum DOP=50% and is available from Air Filtration Products, Inc. of Tucson, Ariz.

The terms and expressions which have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A fan and filter assembly adapted to be installed into a standard expansion slot of a microcomputer for the purpose of forcing filtered air into said microcomputer, said assembly comprising:

(a) a frame, sized to fit into said standard expansion slot, including attachment members adapted to permit attachment of said frame into said standard expansion slot and defining an air passageway through said frame, said air passageway having a first opening coincident to said attachment members and having a second opening positioned away from said attachment members;

(b) an electric fan mounted in said frame and positioned to move air through said air passageway from said first opening through said second opening;

(c) an air filter positioned in said air passageway and adapted to filter particles from air that is being moved from said first opening through said second opening by said fan, said fan assembly being thereby adapted to flush said microcomputer with filtered air; and (d) an electrical conductor and connector assembly adapted to be connected to a source of electrical power and to transmit electrical power from said source of electrical power to said electric fan.

2. The fan assembly of claim 1 wherein said air filter is releasably retained in said air passageway and may be easily removed by way of said first opening.

3. The fan assembly of claim 1 wherein said fan is adapted to operate using 5 VDC electrical power.

4. The fan assembly of claim 1 wherein said air filter has a NaCl efficiency rating of greater than 79%.

5. The fan assembly of claim 1 wherein said air filter has a DOP efficiency rating of greater than 79%.

6. The fan assembly of claim 1 wherein said electric fan has a maximum cross-section of greater than 6 in$^2$.

7. A microcomputer adapted to avoid dust related failures, comprising:

(a) a case defining a set of standard expansion slots; and (b) a fan assembly, including:

(i) a frame sized to fit into a said standard expansion slot, including attachment members adapted to permit attachment of said frame into said standard expansion slot and defining an air passageway through said frame, said air passageway having a first opening coincident to said case and having a second opening inside said case;

(ii) an electric fan mounted in said frame and positioned to move air through said air passageway from said first opening through said second opening;

(iii) an air filter positioned in said air passageway and adapted to filter particles from air that is being moved from said first opening through said second opening by said fan, whereby, in conjunction with said electric fan said microcomputer is flushed with filtered air; and (iv) an electrical conductor and connector assembly adapted to be connected to a source of electric power and to transmit electrical power from said standard internal power port to said electric fan.

8. The microcomputer of claim 6 wherein said air filter is releasably retained in said air passageway and may be easily removed by way of said first opening.

9. The microcomputer of claim 7 further including an internal source of electrical power in a predetermined form and wherein said electrical connector and conductor assembly is connected to said internal source of electrical power and said fan is adapted to accept electrical power having said predetermined form.

10. The microcomputer of claim 7 wherein said fan is adapted to operate using 5 VDC electrical power.

11. The microcomputer of claim 5 wherein said air filter has a NaCl efficiency rating of greater than 79%.

12. The microcomputer of claim 5 wherein said air filter has a DOP efficiency rating of greater than 49%.

13. The microcomputer of claim 5 wherein said electric fan has a maximum cross-section of greater than 6 in$^2$.

14. A method of retrofitting a microcomputer having a case and an unused standard expansion slot to be less susceptible to failure due to dust contamination, comprising the steps of:

(a) providing a fan and filter assembly, including:

(i) a frame, sized to fit into said standard expansion slot, including attachment members adapted to permit attachment of said frame into said standard expansion and defining an air passageway through said frame, said air passageway having a first opening coincident to said attachment members and having a second opening positioned away from said attachment members;

(ii) an electric fan mounted in said frame and positioned to move air through said air passageway from said first opening through said second opening;

(iii) an electrical conductor and connector assembly adapted to be connected to a source of electrical power and to transmit electrical power from said source of electrical power to said electric fan; and (iv) a filter positioned in said air passageway and adapted to filter particles from air that is being moved from said first opening through said second opening by said fan; and (b) installing said fan and filter assembly into said expansion slot of said microcomputer so that said fan brings air from outside said case through said first opening and said filter and out through said second opening into the interior of said case thereby permitting said microcomputer to be flushed with clean air by said fan and filter assembly.

15. The method of claim 9 wherein said air filter is releasably retained in said air passageway and may be easily removed by way of said first opening.

16. The method of claim 14 wherein said microcomputer further includes an internal source of electrical power in a predetermined form and wherein said electrical connector and conductor assembly is adapted to be connected to said internal source of electrical power and said fan is adapted to accept electrical power having said predetermined form and further comprising the step of connecting said electrical connector and conductor assembly to said internal source of electrical power.

17. The method of claim 14 wherein said electric fan has a maximum cross-section of greater than 6 $in^2$.

18. The method of claim 14 wherein said air filter has a NaCl efficiency rating of greater than 79%.

19. The method of claim 14 wherein said air filter has a DOP efficiency rating of greater than 49%.

* * * * *